United States Patent [19]
Cavallaro et al.

[11] Patent Number: 5,882,567
[45] Date of Patent: Mar. 16, 1999

[54] METHOD OF MAKING A GOLF BALL HAVING MULTIPLE LAYERS

[75] Inventors: Christopher Cavallaro, Attleboro; John P. Giza, Acushnet, both of Mass.

[73] Assignee: Acushnet Company, Fairhaven, Mass.

[21] Appl. No.: 603,054

[22] Filed: Feb. 16, 1996

[51] Int. Cl.$^6$ .......................... B29C 35/02; B29C 29/10
[52] U.S. Cl. .......................... 264/255; 264/250; 264/273; 264/275; 264/278
[58] Field of Search .................................. 264/250, 254, 264/255, 271.1, 275, 294, 328.7, 328.8, 309, 273, 274, 278

[56] References Cited

U.S. PATENT DOCUMENTS

| | | |
|---|---|---|
| 696,353 | 3/1902 | Richards . |
| 696,366 | 3/1902 | Kempshall . |
| 697,925 | 4/1902 | Kempshall . |
| 698,516 | 5/1902 | Kempshall . |
| 700,658 | 5/1902 | Kempshall . |
| 701,741 | 6/1902 | Kempshall . |
| 704,748 | 4/1902 | Kempshall . |
| 1,855,448 | 4/1932 | Haseltine . |
| 2,364,955 | 12/1944 | Diddel . |
| 3,068,522 | 12/1962 | Nickerson et al. . |
| 3,147,324 | 9/1964 | Ward . |
| 4,173,345 | 11/1979 | Pocklington . |
| 4,203,941 | 5/1980 | Brooker .................................. 264/250 |
| 4,431,193 | 2/1984 | Nesbitt .............................. 273/235 R |
| 4,625,964 | 12/1986 | Yamada ...................................... 273/62 |
| 4,650,193 | 3/1987 | Molitor et al. ......................... 273/228 |
| 4,714,253 | 12/1987 | Nakahara et al. ..................... 273/228 |
| 4,765,853 | 8/1988 | Hoffman ................................ 156/145 |
| 4,848,770 | 7/1989 | Shama ..................................... 273/228 |
| 4,863,167 | 9/1989 | Matsuki et al. ........................... 273/62 |
| 4,919,434 | 4/1990 | Saito ................................ 273/235 R |
| 4,959,000 | 9/1990 | Giza ........................................ 425/116 |
| 5,002,281 | 3/1991 | Nakahara et al. ..................... 273/220 |
| 5,006,297 | 4/1991 | Brown et al. .......................... 264/255 |
| 5,072,944 | 12/1991 | Nakahara et al. ..................... 273/220 |
| 5,150,906 | 9/1992 | Molitor et al. ......................... 273/220 |
| 5,184,828 | 2/1993 | Kim et al. .............................. 273/228 |
| 5,253,871 | 10/1993 | Viollaz .................................. 273/228 |
| 5,314,187 | 5/1994 | Proudfit .............................. 273/235 R |
| 5,467,994 | 11/1995 | Moriyama et al. ..................... 273/222 |

FOREIGN PATENT DOCUMENTS

| | | |
|---|---|---|
| 0 637 459 A1 | 2/1995 | European Pat. Off. . |
| 2 007 581 | 5/1979 | United Kingdom . |

*Primary Examiner*—Angela Ortiz
*Attorney, Agent, or Firm*—Pennie & Edmonds

[57] ABSTRACT

A method of forming a golf ball by forming a core, forming a first layer around the core using a fixed-pin molding process, and forming a second layer around the first layer.

17 Claims, 6 Drawing Sheets

METHOD OF MAKING A GOLF BALL HAVING MULTIPLE LAYERS

FIELD OF THE INVENTION

This invention is directed to a method of making a multi-layer golf ball. In particular, it is directed to a method of forming a golf ball having multiple layers with mechanical interlocking between the layers.

BACKGROUND

It is desirable to provide a multi-layer golf ball having a cover comprised of multiple layers to allow manipulation of material properties to provide desired characteristics such as spin rate, initial velocity, feel to the user, and durability. This has been done in the past by mixing different resins to create a single layer cover with the proper characteristics, or by creating multi-layer balls from successive layers of different resins, each layer providing different beneficial characteristics.

A typical multi-layer balls application is described in U.S. Pat. No. 4,431,193, issued Feb. 14, 1984 to Nesbitt. Two different layers of SURLYN (a trademark of E.I. du Pont De Nemours Co. for ionomer resins) materials are successively molded about a golf ball core to form a multi-layer ball. The outer layer is chosen primarily for the feel it provides to the user, and the inner layer is chosen primarily for its structural properties. One prior art method of molding the cover layer of a golf ball around the core of the golf ball is to support the golf ball core within an injection mold using retractable pins extending from the inner surface of the mold to the surface of the core. These pins touch and support the core in the center of the mold while the cover material is injected into the mold. Once the mold is substantially filled with the cover material, the pins are withdrawn and the cover material fills the cavity between the core and the mold. The cover material is then allowed to solidify in the mold.

Alternatively, two molded hemispheres can be placed around the core of the golf ball and be compression molded to produce a cover layer. The compression molding process involves forming the cover around the core under heat and pressure.

SUMMARY OF THE INVENTION

The invention herein is directed to a method of manufacturing a golf ball having multiple layers surrounding an inner core. More particularly, the invention is directed to a method of manufacturing a golf ball having a core, a first layer surrounding the core and a second layer surrounding the first layer. Still further, the invention is directed to a method of manufacturing a golf ball having a first layer and a second layer, wherein the first and second layers are mechanically interlocked.

The method of manufacturing the golf ball having multiple layers is comprised of the steps of forming a core, forming a first layer around a core using a fixed-pin molding process, and forming a second layer around the first layer. More particularly, the invention is directed to the method of placing a core in a fixed-pin injection mold such that the core is supported by a plurality of pins, injecting a first layer material about the core such that a plurality of apertures are formed in the first layer by the fixed-pins, and, in a second molding process, forming a second layer that surrounds the first layer and that includes protrusions that extend into the apertures in the first layer.

The invention also includes a golf ball comprising a core, a first layer surrounding the core with a plurality of apertures therein and a second layer surrounding the first layer and having a plurality of corresponding protrusions that extend into the apertures of the first layer.

DETAILED DESCRIPTION OF THE PREFERRED EMBODIMENTS

The present invention includes a method of manufacturing a golf ball having multiple layers that comprises the steps of forming a core, forming a first layer around the core using a fixed-pin injection molding process, and forming a second layer around the first layer.

Figure 1:
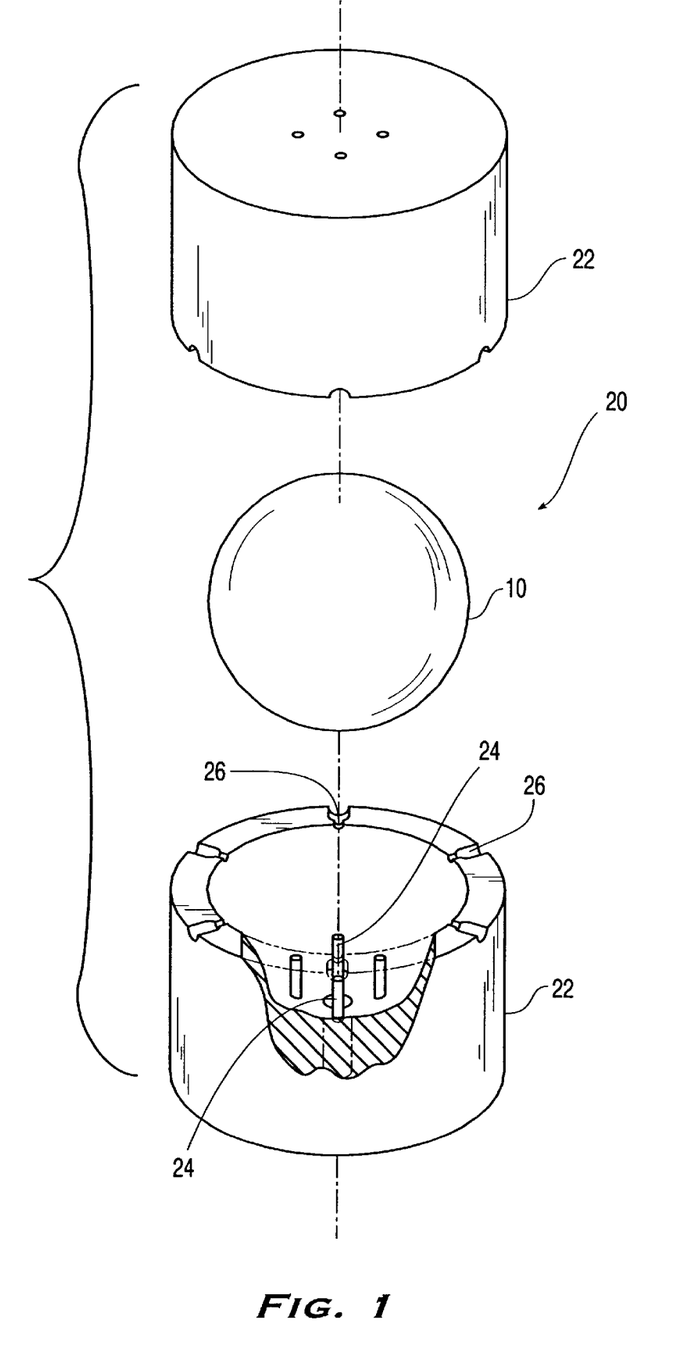
FIG. 1 is an exploded view of a golf ball core in a fixed-pin injection mold.

Referring to FIG. 1, the formation of a golf ball starts with a core 10. Core 10 is traditionally formed by either compression molding a highly cross-linked polybutadiene core material to form a solid core, or by forming a wound core by winding tensioned elastomeric thread about an inner sphere that is solid or fluid filled. The methods of forming cores is well known in the art.

Figure 2:
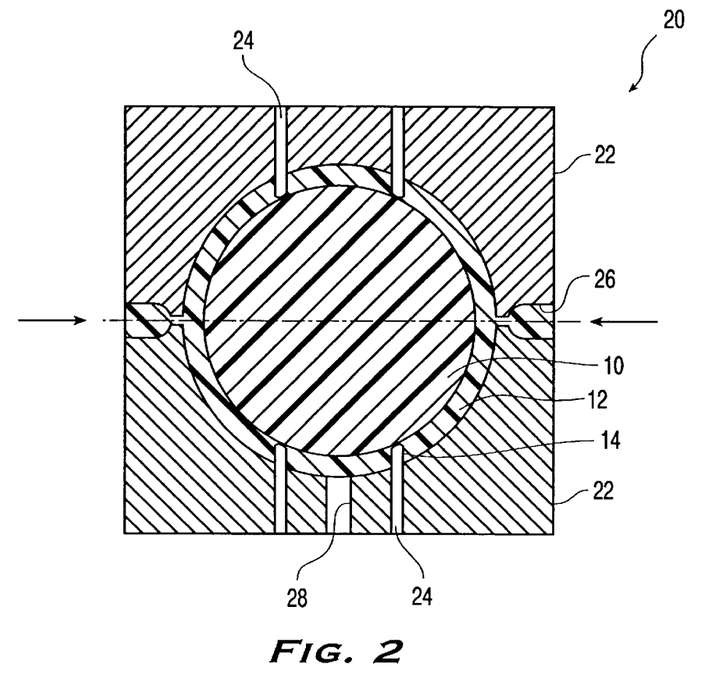
FIG. 2 is a cross-sectional view of a golf ball core and a first layer in a fixed-pin mold.
Figure 2A:
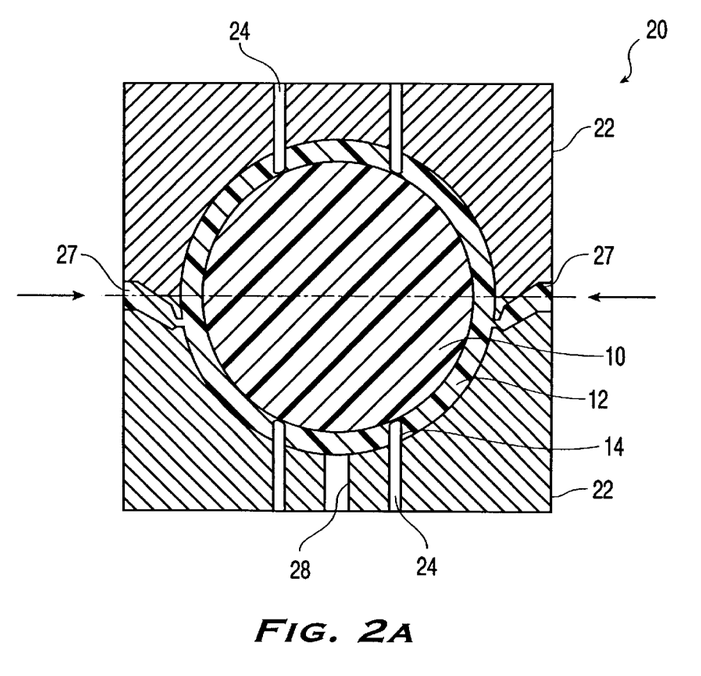
FIG. 2a is a cross-sectional view of a golf ball core and a first layer in a fixed-pin injection mold having sub-gates.

Referring to FIGS. 1, 2 and 2a, the second step in the present invention is to form a first layer 12 around core 10. This is preferably accomplished by placing core 10 into a fixed-pin mold 20. Fixed-pin mold 20 includes two mold-halves 22, each having a plurality of fixed-pins 24 therein for physically locating the core 10 in the center of mold 20. Fixed-pin mold 20 should include at least three pins 24 per mold-half 22 to properly center core 10 in mold 20 and, more preferably, includes four pins per mold-half 22. Still further, the fixed-pins 24 should be aligned substantially parallel to one another and to the direction of the opening and closing of mold-halves 22. This helps facilitate easy removal of the first layer 12 and core 10 from the mold 20. The length of the fixed-pins 24 should preferably be such that they protrude into core 10 by about 0.005 to 0.040 inches. The protrusion of the fixed-pins 24 into core 10 aids in keeping the core 10 centered within mold 20 during the injection molding cycle.

The fixed-pin mold 20 can be a fixed-pin injection mold. As a fixed-pin injection mold, the mold 20 includes a plurality of gates or injection ports 26 for the injection of the first layer material.

The fixed-pin mold 20 can also be a fixed-pin compression mold. As a fixed-pin compression mold, the mold includes a plurality of gates or vents 26 for excess first layer material to extracted from the mold 20.

The step of forming the first layer 12 around core 10 by injection molding is essentially accomplished by inserting core 10 into the fixed-pin mold 20 such that the core 10 is supported and centered by the fixed-pins 24, closing mold 20, injecting the first layer material into mold 20 through gates 26 (FIG. 2) or 27 (FIG. 2a) in a liquid state and allowing the first layer material to solidify about core 10 and fixed-pins 24 to form first layer 12 with apertures 14 therein. Finally, the mold is opened after the first layer 12 has solidified and the core 10 with surrounding first layer 12 is ejected from the mold 20 with knock out pin 28. This leaves apertures 14 visible on the outer surface of the first layer 12.

First layer 12 is preferably formed by injection molding. Injection molding is generally known in the art. The temperatures and curing time for fixed-pin injection mold 20 will be dependent on the material that is being used for first layer 12. Mold 20 can have either edge gates 26 as shown in FIGS. 1 and 2 or sub-gates 27 as shown in FIG. 2a. Edge gates allow the core 10 and first layer 12 combinations to be connected and removed from the mold 20 together. Sub-gating automatically separates the mold runner from the first layer 12 and core 10 combination during the ejection of the combination from mold 20.

Alternatively, the first layer 12 can be formed by compression molding if the first material is formable, such as polybutadiene. To compression mold the first layer 12, a predetermined amount of the first layer material is placed around core 10 and the core 10 and first layer material are placed in the mold 20. The predetermined amount of first layer material is greater than that which actually forms the first layer 12. The compression mold 20 is closed and the pressure and temperature of the mold are increased as is known in the art. The fixed-pins 24 form apertures 14 in the first layer 12 and center the core 10 within the mold 20.

Figure 3:
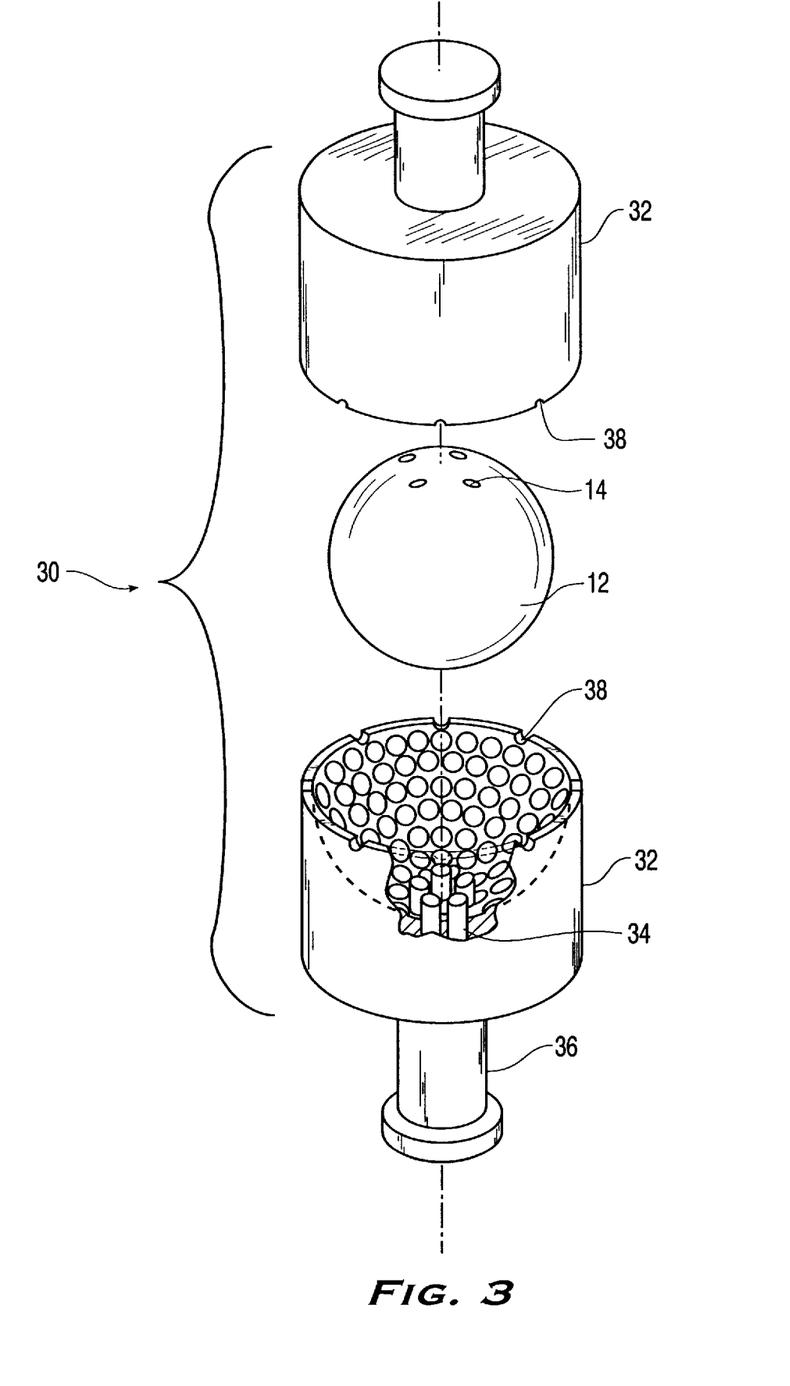
FIG. 3 is an exploded view of a golf ball core and a first layer in a retractable-pin injection mold.
Figure 4:
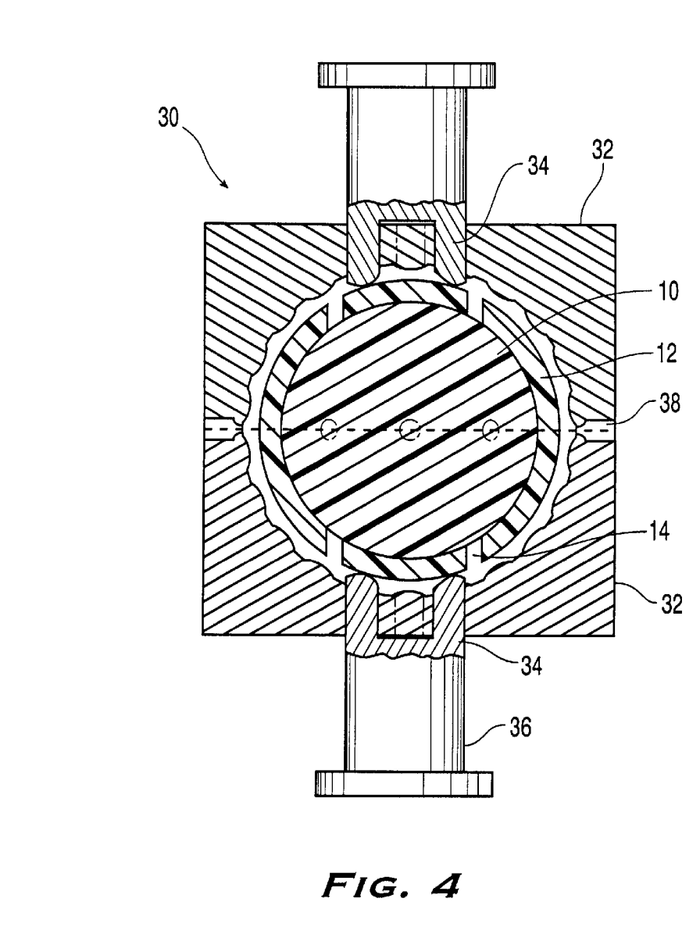
FIG. 4 is a cross-sectional view of a golf ball core and first layer in a retractable-pin injection mold.
Figure 5:
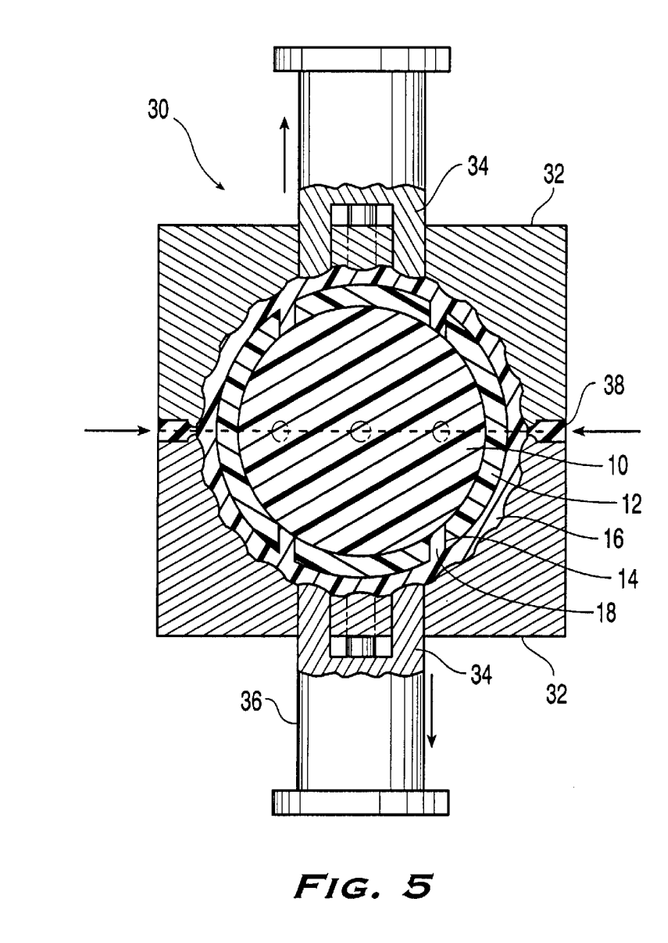
FIG. 5 is a cross-sectional view of a golf ball according to the present invention in a retractable-pin mold.

Referring to FIGS. 3–5, the next step in the present invention is to form a second layer 16 around and interlocking with first layer 12. In a first embodiment, core 10 (not shown) with surrounding first layer 12 is inserted into a retractable pin injection mold 30. First layer 12, which surrounds core 10, is supported within a pair of second layer mold-halves 32 by a plurality of retractable pins 34. These retractable pins are actuated by conventional means known to those of ordinary skill in the art of mold design.

After the mold 30 is closed, the second layer material is injected into mold 30 in a liquid state through a plurality of injection ports or gates 38. Gates 38 can be edge gates or sub-gates. Edge gates allow the final golf balls 50 to be connected and removed from the mold 30 together. Sub-gating automatically separates the mold runner from the golf balls 50 during the ejection of the golf balls from mold 30.

Retractable pins 34 are retracted after a predetermined amount of second layer material has been injected into the mold 30. The predetermined amount of second layer material is substantially all of the material to be injected and the material is allowed to partially solidify before the retractable pins 34 are removed, such that the core 10 does not shift when the retractable pins 34 are removed. This allows the liquid second layer material to flow and substantially fill the cavity between the first layer 12 and the mold-halves 32, as well as flow into the apertures 14 in first layer 12. At the same time, the core 10 and the mold-halves 32 concentricity is maintained.

The second layer material is allowed to solidify, thereby forming second layer 16, which is mechanically locked to first layer 12 by protrusions 18 that extend into apertures 14. The protrusions 18 are thus formed by the flow of second layer material into the apertures 14. Golf ball 50 is then ejected from mold 30, and finished using separate processes which are well known in the art. The temperatures and curing time for mold 30 will be dependent on the material that is being used for second layer 16, which will be discussed in more detail below.

Figure 6:
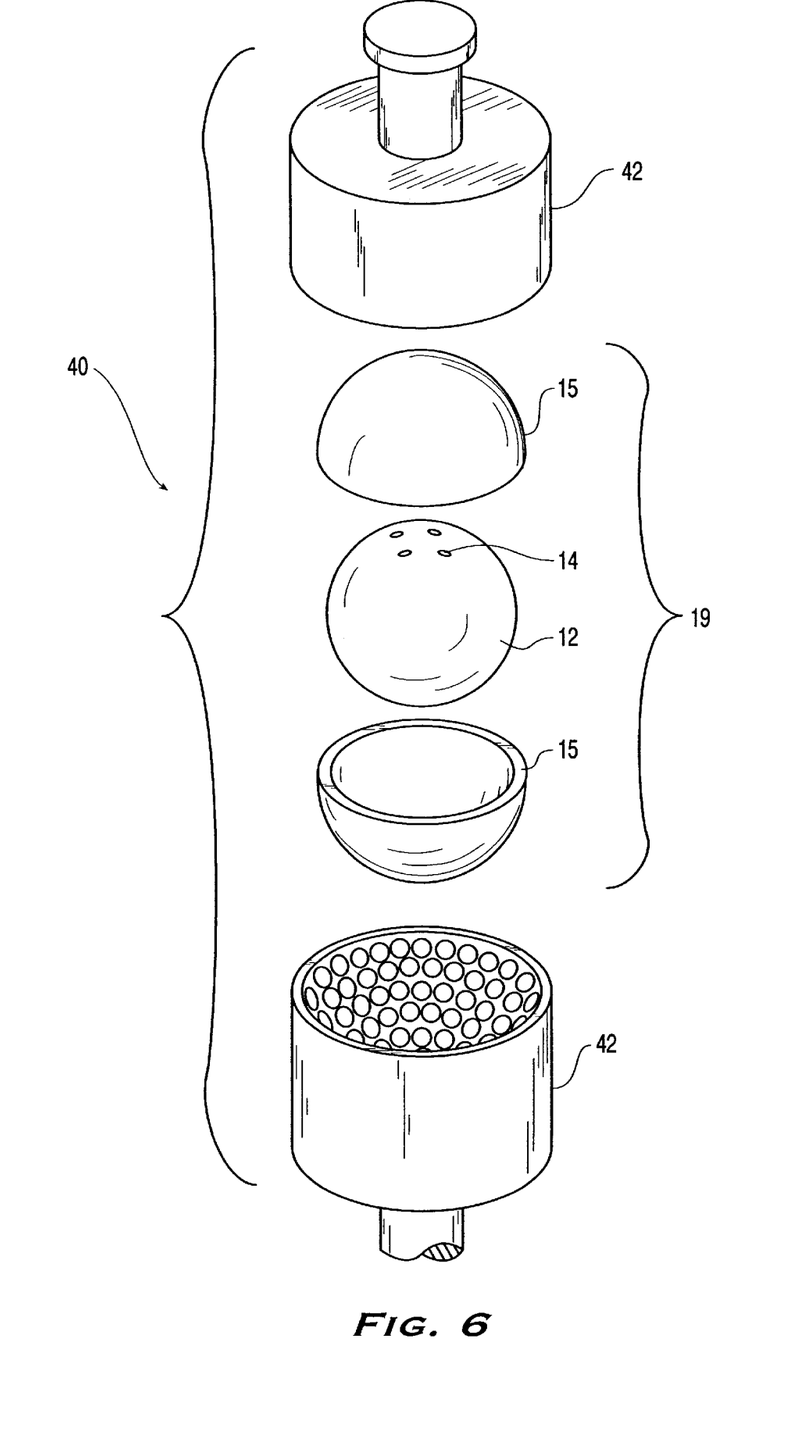
FIG. 6 is an exploded view of a golf ball core and a first layer with second layer hemispheres in a compression mold.
Figure 7:
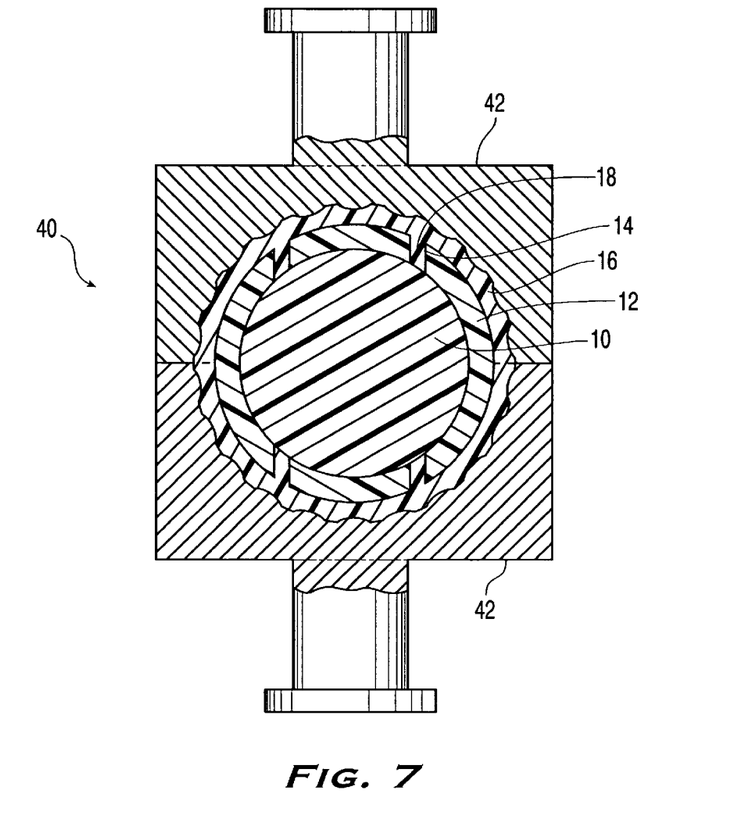
FIG. 7 is a cross-sectional view of a golf ball according to the present invention in a compression mold.

Referring to FIGS. 6 and 7, an alternative method of forming the second layer 16 according to the invention is shown. Two second layer hemispheres 15, made of the desired second layer material, are pre-positioned around first layer 12 which surrounds core 10 thereby forming an assembly 19. Assembly 19 is placed into compression mold 40, which comprises two compression mold-halves 42. Mold-halves 42 are advanced toward each other until their mating surfaces touch, and the mold 40 is heated to melt the hemispheres 15. Mold-halves 42 compress the hemispheres 15 about the core 10 and first layer 12 to mold the second layer material, which substantially fills apertures 14 in first layer 12 by a plurality of protrusions 18.

Figure 8:
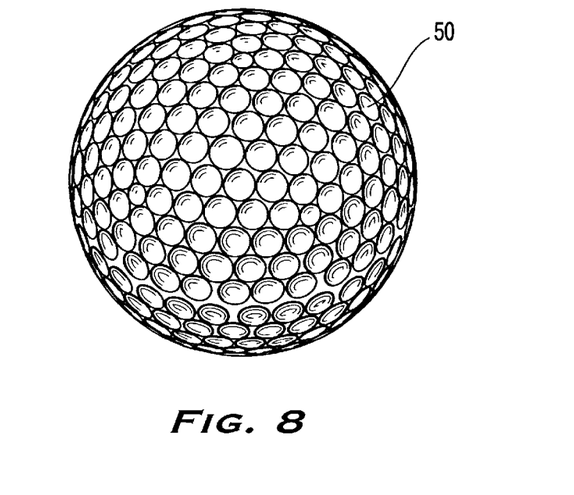
FIG. 8 is a perspective view of a golf ball according to the present invention.

FIG. 8 shows golf ball 50 made according to the methods discussed above. In golf ball 50, the first layer 12 and second layer 16 are substantially secured together by apertures 14 and protrusions 18. Protrusions 18 extend inwardly from the second layer 16 into apertures 14 to mechanically secure second layer 16 and first layer 12 together.

In the preferred embodiment, molds 30 and 40 have raised dimples on their inner surfaces, to impart concave dimples upon the surface of the golf ball 50.

First layer 12 and second layers 16 may be made of thermosetting or thermoplastic materials. For example, the first and second layers 12 and 16 can be formed from thermoplastic elastomers, functionalized styrene-butadiene elastomers, thermoplastic rubbers, thermoset elastomers, thermoplastic urethanes, metallocene polymers, castable urethanes, or ionomer resins, or blends thereof.

The first and second layers 12 and 16 can be formed from thermoplastic elastomers, including dynamically vulcanized thermoplastic elastomers and blends thereof. Suitable dynamically vulcanized thermoplastic elastomers include Santoprene®, Sarlink®, Vyram®, Dytron® and Vistaflex®. Santoprene® is the trademark for a dynamically vulcanized PP/EPDM. Santoprene® 203-40 is an example of a preferred Santoprene® and is commercially available from Advanced Elastomer Systems.

Examples of suitable functionalized styrene-butadiene elastomers include Kraton FG-1901x and FG-1921x, available from the Shell Corporation. Examples of suitable thermoplastic polyurethanes include Estane® 58133, Estane® 58134 and Estane® 58144, which are available from the B.F. Goodrich Company. Further, the materials for the first and second layers 12 and 16 described above may be in the form of a foamed polymeric material. For example, suitable metallocene polymers include foams of thermoplastic elastomers based on metallocene single-site catalyst-based foams. Such metallocene-based foam resins are commercially available from Sentinel Products of Hyannis, Mass.

Suitable thermoplastic polyetheresters include Hytrel® 3078, Hytrel® G3548W and Hytrel® G4078W which are commercially available from DuPont. Suitable thermoplastic polyetheramides include Pebax® 2533, Pebax® 3533, and Pebax® 1205 and Pebax® 4033 which are available from Elf-Atochem.

Suitable thermoplastic polyesters include polybutylene terephthalate.

In a preferred embodiment of the present invention, the first and second layers 12 and 16 are comprised of Santoprene®, thermoplastic polyurethane or blends thereof. However, in another preferred embodiment of the present invention, the first and second layers 12 and 16 are a blend of a first and a second thermoplastic, wherein the first thermoplastic is a dynamically vulcanized thermoplastic elastomer, a functionalized styrene-butadiene elastomer, a thermoplastic polyurethane or a metallocene polymer and the second thermoplastic is a material such as a thermoplastic polyurethane, a thermoplastic polyetherester or polyetheramide, a thermoplastic ionomer resin, a thermoplastic polyester, another dynamically vulcanized elastomer, another functionalized styrene-butadiene elastomer, another metallocene polymer or blends thereof.

Suitable thermoplastic ionomer resins are obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, low modulus ionomers such as acid-containing ethylene copolymer ionomers, include E/X/Y copolymers where E is ethylene, X is a softening comonomer such as acrylate or methacrylate present in 0-50 (preferably 0-25, most preferably 0-2), weight percent of the polymer, and Y is acrylic or methacrylic acid present in 5-35 (preferably 10-35, most preferably 15-35, making the ionomer a high acid ionomer) weight percent of the polymer, wherein the acid moiety is neutralized 1–90% (preferably at least 40%, most preferably at least about 60%) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which the ionomers are made is well known in the art as described in e.g. U.S. Pat. No. 3,262,272 which is incorporated herein by reference. Such ionomer resins include SURLYN® and Iotek®, which are commercially available from DuPont and Exxon, respectively. Likewise, other conventional materials such as balata, elastomer and polyethylene may also be used in the first and second layers 12 and 16 of the present invention.

Such thermoplastic blends comprise about 1% to about 99% by weight of a first thermoplastic and about 99% to about 1% by weight of a second thermoplastic. Preferably the thermoplastic blend comprises about 5% to about 95% by weight of a first thermoplastic and about 5% to about 95% by weight of a second thermoplastic. In a preferred embodiment of the present invention, the first thermoplastic material of the blend is a dynamically vulcanized thermoplastic elastomer, such as Santoprene®.

The present invention also contemplates the use of a variety of non-conventional materials. In particular, the first and second layers 12 and 16 of the present invention may comprise thermoplastic or engineering plastics such as ethylene or propylene based homopolymers and copolymers including functional monomers such as acrylic and methacrylic acid and fully or partially neutralized ionomers and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), reinforced engineering plastics, acrylonitrile-butadiene, acrylic-styrene-acrylonitrile, poly(ethylene terephthalate), poly(butylene terephthalate), poly(ethylene-vinyl alcohol), poly(tetrafluoroethylene and their copolymers including functional comonomers and blends thereof. These polymers or copolymers can be further reinforced by blending with a wide range of fillers and glass fibers or spheres or wood pulp.

As discussed, the present invention includes a first layer 12 and a second layer 16. The first layer 12 of the cover is preferably either a thermoplastic material such as a thermoplastic elastomer or a thermoplastic rubber, or a thermoset rubber or thermoset elastomer material. Some examples of preferred materials suitable for use as the first layer 12 include polyether or polyester thermoplastic urethanes as well as thermoset polyurethanes. A preferable thermoset material is a rubber based, castable urethane. The second layer 16 is preferably either a thermoplastic plastic material such as an elastomer or a thermoplastic rubber, or a thermosetting material. Suitable materials for the second layer include urethanes, ionomers with a low modulus, and other "dead" but durable materials such as EPDM and butyl rubber.

It is preferred that the materials of the second layer 16 and first layer 12 have thermal properties such that no flow of the first layer 12 material occurs during the molding of the second layer 16.

It is further preferred that the material used in forming the second layer have a melting point or heat of reaction (cure) temperature less than the melting point or heat of reaction (cure) temperature of the material used to form the first layer. When the second layer has a lower melting point than the first layer, the holes previously made in the first layer will not be melted and will be substantially filled with the second layer material. It is preferred that the melting point of the first layer material is at least 20 degrees Fahrenheit above the melting point of the second layer material. It is more preferred that the melting point of the first layer material is at least 40 degrees Fahrenheit above the melting point of the second layer material.

Referring again to FIGS. 2 and 3, apertures 14 extend inwardly from the outer surface of the first layer 12 perpendicular to the mold opening plane and generally toward the center of the golf ball. The diameter of these apertures is substantially the same as the diameter of the fixed-pins 24, and measured in a plane perpendicular to the longitudinal axis of the apertures, is preferably in the range between 0.05 and 0.15 inches. Most preferably, the apertures 14 have a diameter of 0.125 inches.

The first layer 12 of this embodiment of the present invention preferably has a thickness of about 0.005 inches to about 0.090 inches. The second layer 16 preferably has a thickness of about 0.010 inches to about 0.100 inches. More preferably, the first layer 12 has a thickness of about 0.010 inches to about 0.080 inches and the second layer 16 has a thickness of about 0.030 inches to about 0.090 inches.

The properties such as hardness, Bayshore resilience, modulus, core diameter and first layer thickness of the golf balls of the present invention have been found to affect play characteristics such as spin, initial velocity and feel of golf balls.

The golf ball of the present invention can have an overall diameter of any size. Although the United States Golf Association (USGA) specifications limit the minimum size of a competition golf ball to more than 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches. However, oversized game balls well in excess of 1.800 inches are also contemplated by the present invention.

Several physical properties such as hardness, resilience and modulus of the various layers of the golf balls of the present invention are believed to impact the playing characteristics of such golf balls. For example, the flexural and/or tensile moduli of the layers are believed to have an effect on the "feel" of the golf balls of the present invention. Accordingly, it is preferable that the golf balls of the present invention have a first layer 12 with a flexural modulus of about 500 psi to about 50,000 psi in order to impart a softer "feel" to the golf balls. Likewise, it is preferred that the first layer 12 have a tensile modulus of about 500 psi to about 50,000 psi in order to impart a softer "feel" to the golf balls of the present invention.

Further, the core 10 of the present invention preferably has a Bayshore resilience greater than 30. Preferably the core has a Bayshore resilience greater than 40. The first layer 12 of the present invention preferably has a Bayshore resilience greater than 35. More preferably the first layer 12 has a Bayshore resilience greater than 50.

The golf balls of the present invention preferably have a first layer 12 with a Shore D hardness of less than about 60. More preferably, the Shore D hardness of the first layer 12 is about 20 to about 60. The core 10 preferably has a Shore D hardness of about 30 to about 65. More preferably, the core 10 has a Shore D hardness of about 35 to about 60.

Preferably, the core 10 is made such that the PGA compression is in the range of 30 to 110. More preferably, the PGA compression of the core is 40 to 100, and most preferably, 50 to 75.

Illustrated in Table I are a number of batch formulations for several first layer 12 compositions prepared according to the present invention, as well as properties such a hardness (Shore D), Bayshore resilience, flexural modulus, % strain at break and tensile modulus for each composition.

These examples of batch compositions are given to illustrate various aspects of the golf balls of the present invention. However, it is to be understood that the examples are only for illustrative purposes and in no manner is the present invention limited to the specific disclosures therein.

TABLE I

First Layer Compositions and Properties

| Sample | Hardness (Shore D) | Resilience | Flex Modulus (psi) | Tensile Modulus (psi) | % Strain at Break |
|---|---|---|---|---|---|
| 1A 0% Estane 58091 100% Estane 58861 | 28 | 54 | 1,720 | 756 | 563 |
| 1B 25% Estane 58091 75% Estane 58861 | 34 | 41 | 2,610 | 2,438 | 626 |
| 1C 50% Estane 58091 50% Estane 58861 | 44 | 31 | 10,360 | 10,824 | 339 |
| 1D 75% Estane 58091 25% Estane 58861 | 61 | 34 | 43,030 | 69,918 | 149 |
| 1E 100% Estane 58091 0% Estane 58861 | 78 | 46 | 147,240 | 211,288 | 10 |
| 2A 0% Hytrel 5556 100% Hytrel 4078 | 40 | 51 | 9,250 | 7,071 | 527 |
| 2B 25% Hytrel 5556 75% Hytrel 4078 | 43 | 51 | 10,020 | 9,726 | 441 |
| 2C 50% Hytrel 5556 50% Hytrel 4078 | 45 | 47 | 12,280 | 10,741 | 399 |
| 2D 75% Hytrel 5556 25% Hytrel 4078 | 48 | 53 | 13,680 | 13,164 | 374 |
| 2E 100% Hytrel 5556 0% Hytrel 4078 | 48 | 52 | 12,110 | 15,231 | 347 |
| 3A 0% Hytrel 5556 100% Hytrel 3078 | 30 | 62 | 4,000 | 2,078 | 810 no break |
| 3B 25% Hytrel 5556 75% Hytrel 3078 | 37 | 59 | 8,170 | 5,122 | 685 |
| 3C 50% Hytrel 5556 50% Hytrel 3078 | 44 | 55 | 15,320 | 10,879 | 590 |
| 3D 75% Hytrel 5556 25% Hytrel 3078 | 53 | 50 | 19,870 | 16,612 | 580 |
| 3E 100% Hytrel 5556 0% Hytrel 3078 | 58 | 50 | 24,840 | 17,531 | 575 |
| 4A 0% Hytrel 4078 100% Pebax 4033 | 46 | 51 | 11,150 | 8,061 | 597 |
| 4B 25% Hytrel 4078 75% Pebax 4033 | 46 | 53 | 10,630 | 7,769 | 644 |
| 4C 50% Hytrel 4078 50% Pebax 4033 | 45 | 52 | 9,780 | 8,117 | 564 |

TABLE I-continued

First Layer Compositions and Properties

| Sample | Hardness (Shore D) | Resilience | Flex Modulus (psi) | Tensile Modulus (psi) | % Strain at Break |
|---|---|---|---|---|---|
| 4D 75% Hytrel 4078 25% Pebax 4033 | 42 | 53 | 9,310 | 7,996 | 660 |
| 4E 100% Hytrel 4078 0% Pebax 4033 | 40 | 51 | 9,250 | 7,071 | 527 |
| 5A 0% Hytrel 3078 100 Estane 5809 | 77 | 50 | 156,070 | 182,869 | 9 |
| 5B 25% Hytrel 3078 75% Estane 5809 | 65 | 48 | 87,680 | 96,543 | 33 |
| 5C 50% Hytrel 3078 50% Estane 5809 | 52 | 49 | 53,940 | 48,941 | 102 |
| 5D 75% Hytrel 3078 25% Estane 5809 | 35 | 54 | 12,040 | 6,071 | 852 |
| 5E 100% Hytrel 3078 0% Estane 5809 | 29 | 62 | 4,000 | 2,078 | 810 no break |
| 6A 100% Kraton 1921 0% Estane 58091 0% Surlyn 7940 | 29 | 59 | 24,300 | 29,331 | 515 |
| 6B 50% Kraton 1921 50% Estane 58091 0% Surlyn 7940 | 57 | 49 | 56,550 | - | 145 |
| 6C 50% Kraton 1921 0% Estane 58091 50% Surlyn 7940 | 56 | 55 | 28,290 | 28,760 | 295 |
| 7A 33.3% Pebax 4033 33.3% Estane 58091 33.3% Hytrel 3078 | 48 | 50 | 41,240 | 30,032 | 294 |
| 7B 30% Pebax 4033 40% Estane 58091 10% Hytrel 3078 | 48 | 50 | 30,650 | 14,220 | 566 |
| 7C 20% Pebax 4033 40% Estane 58091 40% Hytrel 3075 | 41 | 54 | 24,020 | 16,630 | 512 |

Tables II and III provide test data obtained embodiments of the present invention. In particular, the spin rate and velocity were measured for golf balls formed according to the present invention. In a first ball the first layer 12 was 100% Estane 58881, the second layer 16 was a conventional Li/Na SURLYN® blend and the core was a conventional crosslinked polybutadiene core and, in a second ball, the first layer 12 was Hytrel 3078, the second layer 16 was a conventional Li/high acid Na SURLYN® 50—50 blend and the core 10 was a conventional cross-linked polybutadiene core. Also tested were conventional two piece golf balls (a Titleist HVC 90 and Pinnacle Gold). Each ball was tested in a True Temper Test Machine. The test machine was configured to strike the balls with a Driver and an Eight Iron.

TABLE II

Spin Rate Test Results for Driver

| Sample | Launch Angle | Spin (rpm) | Velocity (ft/sec) |
|---|---|---|---|
| Titleist HVC | 9.3° | 3038 | 234.9 |
| Pinnacle Gold | 9.3° | 3027 | 233.6 |
| Li/Na SURLYN second layer Estane first layer w/ 1.30" polybutadiene core | 8.8° | 3677 | 230.1 |
| Li/Na (high acid) SURLYN second layer Hytrel first layer w/ 1.39" polybutadiene core | 9.1° | 2966 | 234.7 |

TABLE III

Spin Rate Test Results for 8-Iron

| Sample | Launch Angle | Spin (rpm) | Velocity (ft/sec) |
|---|---|---|---|
| Titleist HVC | 19.5° | 7690 | 166.1 |
| Pinnacle Gold | 19.8° | 7549 | 165.4 |
| Li/Na SURLYN second layer Estane first layer w/1.30" polybutadiene core | 18.7° | 8115 | 162.7 |
| Li/Na (high acid) SURLYN second layer Hytrel first layer w/1.39" polybutadiene core | 20.2° | 7326 | 167.9 |

Referring back to the manufacturing process, in the step of injection molding the first layer 12, the first layer material, such as Hytrel, is injected into the mold 20 at a first temperature greater than 320 degrees Fahrenheit. More preferably, the first layer material is injected into the mold 20 at a first temperature of approximately 400 degrees Fahrenheit. In the step of compression molding the second layer 16, the second layer material, such as Li/Na SURLYN, is compression molded about the first layer 12 at a second temperature less than 320 degrees Fahrenheit. More preferably, the second layer material is compression molded at a second temperature of approximately 290 degrees Fahrenheit. Thus, in the preferred method, the step of forming the first layer 12 is performed at a first temperature and the second layer is formed at a second temperature, wherein the first temperature is 50 degrees Fahrenheit greater than the second temperature. More preferably, the step of forming the first layer 12 is performed at a first temperature and the second layer 16 is formed a second temperature that is more than 75 degrees Fahrenheit less than the first temperature. Most preferably, the second temperature is approximately 100 Fahrenheit degrees less than the first temperature.

While it is apparent that the illustrative embodiments of the invention herein disclosed fulfill the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

We claim:

1. A method of manufacturing a golf ball comprising the steps of:

forming a core;

providing a mold having a plurality of pins;

positioning the core within the mold on the pins;

injecting a first layer material in a liquid form in the mold around the core and the pins wherein, the step of injecting a first layer material further includes raising the temperature of the first layer material to a first melting point temperature so that the first layer material changes to the liquid form;

solidifying the first layer material to form a first layer around the core and the pins;

removing the pins from the first layer to form a plurality of apertures in the first layer; and molding a second layer material around the first layer, wherein the step of molding a second layer material further includes the steps of positioning the core with the surrounding first layer within a retractable pin-injection mold, raising the temperature of the second layer material to a second melting point temperature that is at least 20 degrees Fahrenheit lower than the first melting point temperature so that the second layer material changes to a liquid form, injecting the second layer material in the liquid form into the retractable pin-injection mold and around the first layer, thereby partially filling at least some of the apertures in the first layer with the second layer material, and forming a second layer having a plurality of protrusions extending into the apertures in the first layer, and allowing the second layer material to substantially solidify to substantially interlock the second layer to the first layer.

2. The method of claim 1 wherein the step of molding a second layer material further includes completely filling the apertures with the second layer material.

3. The method of claim 1 wherein the step of providing a mold further comprises fixing the pins to the mold.

4. A method of manufacturing a golf ball comprising the steps of:

forming a core;

providing a mold having a plurality of pins;

positioning the core within the mold on the pins;

injecting a first layer material in a liquid form in the mold around the core and the pins;

solidifying the first layer material to form a first layer around the core and the pins, wherein the steps of injecting a first layer material and solidifying the first layer material further comprise forming a mold runner attached to the first layer;

removing the pins from the first layer to form a plurality of apertures in the first layer, said apertures with a diameter ranging from 0.05 inches to 0.15 inches, and the step of removing the pins further includes separating the mold runner from the first layer; and molding a second layer material around the first layer, wherein the step of molding a second layer material further includes the steps of positioning the core with the surrounding first layer within a retractable pin-injection mold, injecting the second layer material in a liquid form into the retractable pin-injection mold and around the first layer, thereby partially filling at least some of the apertures in the first layer with the second layer material, and forming a second layer having a plurality of protrusions extending into the apertures in the first layer, and allowing the second layer material to substantially solidify to substantially interlock the second layer to the first layer.

5. A method of manufacturing a golf ball comprising the steps of:

forming a core;

surrounding the core with a first layer material;

providing a compression mold having a plurality of fixed-pins;

positioning the core with the surrounding first layer material within the compression mold on the fixed-pins;

compression molding the core with the surrounding first layer material to form a first layer with the pins disposed therein, wherein the step of compression molding further includes the step of raising the temperature of the first layer material to a first melting point temperature which is greater than 300 degrees Fahrenheit;

removing the pins from the first layer to form a plurality of apertures in the first layer; and molding a second layer material around the first layer, wherein the step of molding a second layer material further includes the step of raising the temperature of the second layer material to a second melting point temperature less than 300 degrees Fahrenheit and the first melting point temperature is more than 50 degrees Fahrenheit greater than the second melting point temperature, thereby partially filling the apertures in the first layer with the second layer material, and forming a second layer having a plurality of protrusions extending into the apertures in the first layer to substantially interlock the second layer to the first layer.

6. The method of claim 1 wherein the step of providing a mold further comprises aligning the pins substantially parallel to one another.

7. The method of claim 1, further comprising the step of forming the apertures with a diameter ranging from 0.05 inches to 0.15 inches.

8. The method of claim 1 wherein the step of raising the temperature of the second layer material includes raising the temperature to the second melting point temperature that is at least 40 degrees Fahrenheit lower than the first melting point temperature.

9. The method of claim 1 wherein the step of injecting a first layer material includes selecting the first layer material from the group comprising: thermoplastic urethane, thermoplastic elastomer, thermoplastic rubber, castable urethane and combinations thereof.

10. The method of claim 1 wherein the step of molding a second layer material further includes selecting the second layer material from the group comprising: thermoplastic urethane, thermoplastic elastomer, thermoplastic rubber, and castable urethane, ionomers, high acid ionomers and combinations thereof.

11. A method of manufacturing a golf ball comprising the steps of:

forming a core;

providing a mold having a plurality of pins;

positioning the core within the mold on the pins;

injecting a first layer material in a liquid form in the mold around the core and the pins, wherein the step of injecting a first layer material further includes the step of raising the temperature of the first layer material to a first melting point temperature which is greater than 300 degrees Fahrenheit;

solidifying the first layer material to form a first layer around the core and the pins;

removing the pins from the first layer to form a plurality of apertures in the first layer; and molding a second layer material around the first layer, wherein the step of molding the second layer material further includes the steps of positioning the core with the surrounding first layer within a retractable pin-injection mold; raising the temperature of the second layer material to a second melting point temperature less than 300 degrees Fahrenheit, injecting the second layer material in a liquid form into the retractable pin-injection mold and around the first layer, thereby partially filling at least some of the apertures in the first layer with the second layer material, and forming a second layer having a plurality of protrusions extending into the apertures in the first layer, and allowing the second layer material to substantially solidify to substantially interlock the second layer to the first layer.

12. The method of claim 11 wherein the first melting point temperature is more than 50 degrees Fahrenheit greater than the second melting point temperature.

13. The method of claim 11 wherein the first melting point temperature is more than 75 degrees Fahrenheit greater than the second melting point temperature.

14. The method, of claim 11 wherein the first melting point temperature is approximately 100 degrees Fahrenheit greater than the second melting point temperature.

15. The method of claim 11 wherein the step of molding a second layer material further comprises completely filling the apertures with the second layer material.

16. The method of claim 11 wherein the step of providing a mold further comprises fixing the pins to the mold.

17. A method of manufacturing a golf ball comprising the steps of:

forming a core;

providing a mold having a plurality of pins;

positioning the core within the mold on the pins;

injecting a first layer material in a liquid form in the mold around the core and the pins, wherein the step of injecting a first layer material further includes the step of raising the temperature of the first layer material to a first melting point temperature so that the first layer material changes to the liquid form;

solidifying the first layer material to form a first layer around the core and the pins;

removing the pins from the first layer to form a plurality of apertures in the first layer; and molding a second layer material around the first layer, wherein the step of molding a second layer material further includes the step of raising the temperature of the second layer material to a second melting point temperature that is at least 20 degrees Fahrenheit lower than the first melting point temperature, so that the second layer material changes to a liquid form, thereby partially filling at least some of the apertures in the first layer with the second layer material, and forming a second layer having a plurality of protrusions extending into the apertures in the first layer to substantially interlock the second layer to the first layer.

* * * * *